Aug. 21, 1956
O. C. BLOMGREN
2,759,776
POWER TRANSMISSION COUPLING DEVICE
Filed Dec. 22, 1955
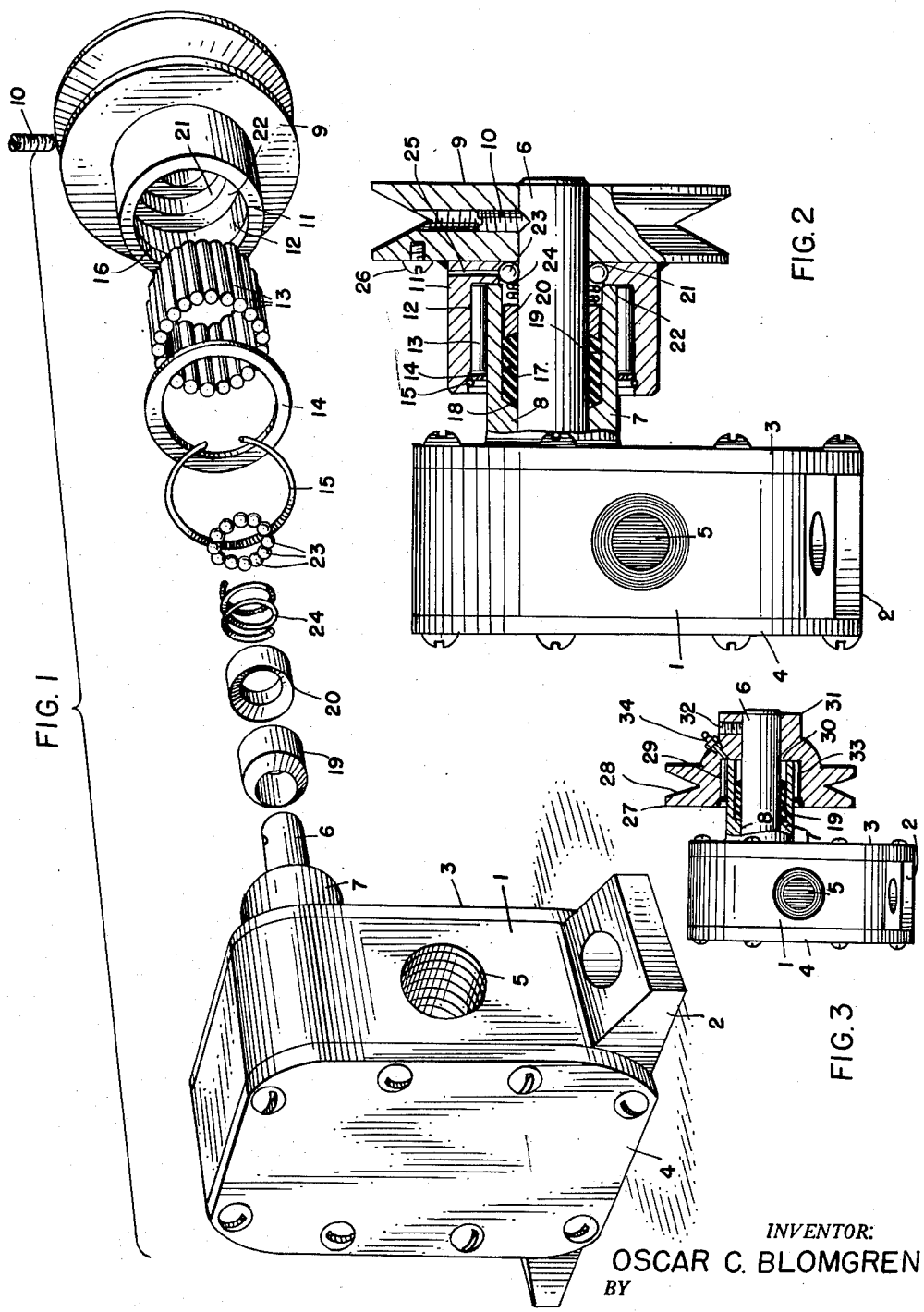
INVENTOR:
OSCAR C. BLOMGREN
BY
Marzall, Johnston, Cook & Root.
ATT'YS

United States Patent Office 2,759,776
Patented Aug. 21, 1956

2,759,776
POWER TRANSMISSION COUPLING DEVICE

Oscar C. Blomgren, Evanston, Ill., assignor to Tuxco Corporation, North Chicago, Ill., a corporation of Illinois Application December 22, 1955, Serial No. 554,719

11 Claims. (Cl. 308—187.1)

This invention relates in general to a coupling device which is particularly applicable for use in coupling a source of power to a shaft which operates or drives a mechanism, and is designed for the purpose of relieving the stress on the drive shaft created by the application of power thereto.

The invention has universal application to drive shafts regardless of the mechanism being driven thereby and regardless of the specific type of power application. For example, the device is useful whether power is transmitted by a direct drive coupling or by other means, such as universal joints, yokes, sheaves, cranks, sprockets, and the like.

When a source of power is coupled with a drive shaft in the conventional manner, stresses are brought to bear upon the shaft which tend to pull the shaft out of alignment and to cause wear thereon, thereby necessitating frequent replacement of the shaft, its bearings, and driven members. The present invention is designed to overcome such disadvantages as this by relieving the shaft of the stresses and transmitting them to a boss through which the shaft extends, as will be more fully pointed out hereinafter.

It is, therefore, the principal object of the present invention to provide a novel form of coupling device which is capable of relieving stresses on drive shafts, driven members and conventional drive shaft bearings created by high torque power application and the pull of power transmission devices within the power train.

Another object of the invention is to provide a novel coupling device for transmission of power from a power source to a drive shaft which will substantially reduce or eliminate stresses on the drive shaft, its driven members, and its bearings otherwise present in the application of power thereto, and which uses a non-functional bearing land rather than a bearing shaft.

A further object of the invention is to provide a coupling device for transmitting power from a power source to a drive shaft wherein the bearing surface for the device is the drive shaft bearing, whereby stresses set up by the application of power to the shaft will be taken by the bearing.

A still further object of the invention is to provide a coupling device for transmitting power from a power source to a drive shaft for driving a mechanism, wherein a boss on the mechanism itself is provided with an inner bearing surface for the shaft, and wherein the coupling has a sleeve thereon to receive the boss, with anti-friction bearings between the sleeve and the external bearing surface of the boss, thus relieving stresses on the shaft and transmitting them to the exterior surface of the boss.

Still another and more specific object of the invention is to provide a coupling device which is particularly adapted for transmitting power from a power source to the drive shaft of a mechanism, such as a pump, having rotary propulsion means therein, and wherein the coupling is provided with a sleeve to receive a boss on the pump through which the shaft passes, and anti-friction bearing means between the sleeve and boss relieves stresses on the shaft and transmits them to the exterior surface of the boss.

Other objects and advantages of the invention will become apparent upon reading the following description taken in conjunction with the accompanying drawing, in which Fig. 1 is an exploded view in perspective illustrating the parts of a coupling device embodying the present invention;

Fig. 2 is a vertical longitudinal sectional view through the assembled coupling device illustrating the invention as applied to a pump, said pump being shown in elevation, and Fig. 3 is a view similar to Fig. 2, but showing a modified arrangement of the invention.

As above stated, the invention herein resides in a combination of elements designed to relieve stress on a drive shaft when power is applied thereto. The invention is equally applicable regardless of the specific type of coupling device used, whether it be a direct drive coupling or some other form where power is applied to the drive shaft by means of a crank, or belt driven pulleys, or chain driven sprockets, universal joints, yokes, and the like. The device is also applicable regardless of the particular type of mechanism being operated by the drive shaft. For the purpose of illustration, therefore, the invention is shown as applied to a sheave device for coupling a source of power to the drive shaft of a pump.

The invention consists primarily in the employment of three basic elements. The first is the coupling device itself which may consist of a single or multiple belt V or flat pulley, a direct drive coupling, a sprocket, a universal joint, a yoke, and the like. The second basic element is an anti-friction bearing member of any suitable type, such as a ball, roller, taper, or needle bearing, or a bearing in the form of a bronze, carbon or plastic ring which is assembled with and forms a part of the coupling itself. The third basic element comprises a machined boss which is a part of or attached to the mechanical device to which the principle is to be applied. A shaft protrudes from the boss of the mechanical device which may be the driving or driven member.

As will be presently seen, variations of and additions to this basic combination may be made for specific applications, for example, in applying the device to a fluid pump.

Referring now more particularly to the drawing, and especially to Figs. 1 and 2, where the mechanical device to which the principle is applied is illustrated as a pump, the numeral 1 indicates the pump housing having a base 2 and end cap or closure members 3 and 4 at the opposed sides thereof. The pump may be provided with the usual inlet and outlet openings for the passage of fluid therethrough, one of which is shown at 5.

The pump is of the rotary type wherein rotary propulsion members are mounted within the housing, such members being gears, impellers, blades, and the like (not shown). A shaft 6 protrudes from the housing and is rotatably supported in a boss 7 formed as an integral part of or secured to the end closure plate 3. The inner surface 8 of the bore through the boss 7 acts as a bearing surface and rotatably supports the shaft 6.

The application of power to rotate the shaft 6 with conventional coupling devices causes a pull on the shaft which sets up stresses therein causing wear to occur between the shaft and its supporting bearing and ultimately on the rotary propulsion members. Such stress is relieved by the application of the present invention which is illustrated herein as constituting a sheave which includes a pulley 9 mounted on the shaft 6 and secured thereto for rotation therewith by suitable means, such as a set screw 10.

A boss or sleeve 11 is integral with or is welded or otherwise secured to one face of the pulley 9 and has a bore 12 therein of a diameter greater than the outer diameter of the boss 7. The sleeve 11 is adapted to receive the boss 7, and the difference in the two diameters provides an annular recess for the reception of anti-friction bearing means therein. The particular bearing means shown for purposes of illustration consists of the roller bearings 13 which contact the outer hardened surface of the boss 7 and the bore of the sleeve 11. It will be evident to those skilled in the art that other specific types of anti-friction bearing members on assemblies may be used, such as ball bearings, needle bearings, tapered bearings, or anti-friction ring members made of a self-lubricating material such as sintered bronze, carbon or plastic.

Suitable retaining means are provided for maintaining the anti-friction bearings in place which may include a ring 14 and a split retaining ring 15 adapted to be received partially within an annular groove 16 within the bore of the sleeve 11.

It will thus be evident that when a source of power, such as a motor, is connected by means of a belt to the pulley 9, the stress or pull created by the application of that power will be taken by the boss 7, thereupon relieving any such stress in the shaft 6. The same advantage may be obtained even though a crank, or a universal joint or yoke coupling, or a sprocket is substituted for the pulley 9, or if the pulley is placed directly over the boss as shown in Fig. 3.

If the mechanical device to be driven by the coupling embodying the present invention is a fluid pump or other similar device involving the use of packing glands, the additional construction shown, and presently to be described, may be used. In such case the boss 7 will have an internal bore 17 extending inwardly from the outer end thereof and will have a reduced diameter adjacent its inner end resulting in an annular shoulder 18. A packing gland 19 is then inserted in the annular space provided between the shaft 6 and bore 17 and held in place by an annular retaining member 20.

Also in this application the bore 12 in sleeve 11 will have a portion of reduced diameter as shown at 21, thereby providing a shoulder 22 against which the outer end of boss 7 may abut. The resulting annular recess between the reduced portion 21 and shaft 6 may then receive a thrust bearing consisting of any suitable anti-friction device, such as the ball bearings 23. A coiled spring 24 is then inserted between the thrust bearing 23 and the end of the retaining member 20, thereby to maintain a pressure on the packing gland.

It will be evident from the foregoing that by thus multiplying the bearing surface and using the non-functional bearing land of the machined boss as the bearing surface of the coupling device, rather than the shaft itself, it relieves the shaft, shaft bearing, and driven members of stress, reduces the flexure of the shaft and allows simple replacement of bearings.

If desired, provision may be made for removing liquid drip and preventing it from passing through the bearing on the boss. This is desirable in pumping acids or salts; for example, it is known that in present pumps grease is washed out of the bearings by calcium chloride solution when that is being pumped.

To obviate this difficulty, a radially extending hole 25 may be drilled through the sleeve 11 which will permit liquid to drip therethrough and prevent it from going through the bearing on the boss. The liquid will be thrown outwardly by centrifugal force during rotation of the pulley, and it is desirable to provide some means for deflecting this liquid as it is thrown outwardly. One manner of accomplishing this result is to provide a protuberance, such as the screw 26, the head of which extends over the outer end of hole 25. Thus, when liquid is thrown outwardly through the hole 25 it will be deflected by the screw 26.

Fig. 3 illustrates a modified form of the invention wherein the pulley is shown in such a position that the V-groove thereof is directly over the boss. It will be understood again that other specific coupling means than a pulley may be used, such as a sprocket, crank, yoke, or universal joint.

In this form of the invention the pump structure as heretofore described is the same wherein the boss 7 on the cover 3 extends outwardly at one side and rotatably supports the shaft 6. Suitable packing 19 may be disposed between the boss and the shaft. The pulley is indicated by the numeral 27 and is so constructed that the V-groove 28 therein will be located directly over the boss 7. The pulley has a recess 29 therein to receive the boss 7 which recess has a portion of reduced diameter, thereby to provide a shoulder 30 against which the outer end of the boss 7 may abut. The sleeve 31 extends outwardly from the pulley 27 and is provided with a set screw 32, whereby the pulley may be secured to the shaft 6 and rotated therewith.

Suitable bearings, such as the roller bearings 33, may be disposed between the pulley and the boss 7 in the same manner as heretofore described with respect to the other form of the invention.

The structure lends itself to a pre-packed and sealed unit, if desired, but if it is not so pre-packed, then it may be desirable to provide a grease cup, as shown at 34, in order to provide lubrication for the bearing. This latter form of the device is advantageous from the standpoint of conserving space and at the same time it centers the stress directly over the bearing and the boss.

The device of the present invention has many applications and can be used to advantage in almost every industry as has been indicated heretofore. The device also has many advantages over the conventional coupling devices heretofore known. For example, the drive shaft itself cannot be damaged by scoring, and gears, impellers, rotors, and other mechanical elements will be relieved of excessive wear due to shaft vibration and bearing wear. When the principle is applied to pulleys it would eliminate the necessity for dynamically balancing them. The inexpensive multiplication of bearing surfaces without the sacrifice of space makes it possible for extremely small devices to adapt themselves readily to larger bearings than heretofore possible. In many cases where fluids are not involved, the original bearing turning on the drive or driven shaft can be eliminated, the substitute being the larger and more adequate bearing contained within the coupling.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A coupling device for the transmission of power from a power source to a shaft supported in a bearing comprising, a pulley adapted to be mounted on the shaft for rotation therewith, an annular boss on said pulley adapted to receive the shaft bearing, the internal diameter of said boss being greater than the external diameter of the shaft bearing which it is adapted to receive, thereby providing an annular recess between said boss and the shaft bearing, anti-friction bearing means in said annular recess, and an inner portion of reduced diameter in said boss at the end thereof adjacent said pulley, thereby providing a second annular recess between said boss and the shaft, and additional anti-friction bearing means in said second annular recess.

2. A coupling device for the transmission of power from a power source to a shaft supported in a bearing comprising, a pulley adapted to be mounted on the shaft for rotation therewith, an annular boss on said pulley adapted to receive the shaft bearing, the internal diameter of said boss being greater than the external diameter of the shaft bearing which it is adapted to receive, thereby providing an annular recess between said boss and the shaft bearing, a plurality of roller bearings in said annular recess, an inner portion of reduced diameter in said boss at the end thereof adjacent said pulley, thereby providing a second annular recess between said boss and the shaft, and a plurality of ball bearings in said second annular recess.

3. A power transmission coupling assembly for coupling a power source to a mechanism to be driven thereby, comprising a boss on said mechanism, a shaft extending through said boss and beyond the end thereof and rotatably supported thereby, a driving member fixed to said shaft for rotation therewith, and adapted to be connected with the power source, a sleeve on said driving member to receive the boss on said mechanism, anti-friction bearing means between the outer surface of said boss and the inner surface of said sleeve, and a second anti-friction bearing means between the inner surface of said sleeve and said shaft, whereby said shaft will be relieved of stress.

4. A power transmission coupling assembly for coupling a power source to a mechanism to be driven thereby, comprising a boss on said mechanism, a shaft extending through said boss and beyond the end thereof and rotatably supported thereby, a driving member fixed to said shaft for rotation therewith and adapted to be connected with the power source, a sleeve on said driving member to receive said boss, the internal diameter of said sleeve throughout the major portion thereof being larger than the outer diameter of said boss, thereby providing an annular recess between said sleeve and boss, the remainder of said internal diameter being reduced to provide a shoulder against which the outer end of said boss abuts and an annular recess between said reduced portion and said shaft, and anti-friction bearing means in each of said annular recesses, thereby relieving said shaft of stress.

5. A power transmission coupling assembly for coupling a power source to a mechanism to be driven thereby, comprising a boss on said mechanism, a shaft extending through said boss and beyond the end thereof and rotatably supported thereby, a driving member fixed to said shaft for rotation therewith and adapted to be connected with the power source, a sleeve on said driving member to receive the boss on said mechanism, a plurality of roller bearing members between said boss and sleeve, and a plurality of ball bearing members between said sleeve and shaft, thereby to relieve said shaft of stress.

6. A power transmission coupling assembly for coupling a power source to a mechanism to be driven thereby, comprising a boss on said mechanism, a shaft extending through said boss and beyond the end thereof and rotatably supported thereby, a driving member fixed to said shaft for rotation therewith and adapted to be connected with the power source, a sleeve on said driving member to receive said boss, the internal diameter of said sleeve throughout the major portion thereof being larger than the outer diameter of said boss, thereby providing an annular recess between said sleeve and boss, the remainder of said internal diameter being reduced to provide a shoulder against which the outer end of said boss abuts and an annular recess between said reduced portion and said shaft, a plurality of roller bearing means in said first named annular recess, and a plurality of ball bearing means in said second named recess, whereby stress on said shaft will be relieved.

7. A power transmission coupling assembly for coupling a power source to a mechanism to be driven thereby, comprising a boss on said mechanism, a shaft extending through said boss and beyond the end thereof and rotatably supported thereby, an annular space between said shaft and boss to receive a packing member therein, a driving member fixed to said shaft for rotation therewith and adapted to be connected with the power source, a sleeve on said driving member to receive the boss on said mechanism, anti-friction bearing means between the outer surface of said boss and the inner surface of said sleeve, other anti-friction bearing means between the inner surface of said sleeve and said shaft, whereby said shaft will be relieved of stress, and yieldable means between said last named anti-friction means and said packing member.

8. A power transmission coupling assembly for coupling a power source to a mechanism to be driven thereby, comprising a boss on said mechanism, a shaft extending through said boss and beyond the end thereof and rotatably supported thereby, an annular space between said shaft and boss to receive a packing member therein, a driving member fixed to said shaft for rotation therewith and adapted to be connected with the power source, a sleeve on said driving member to receive the boss on said mechanism, a plurality of roller bearing members between the outer surface of said boss and the inner surface of said sleeve, a plurality of ball bearing members between the inner surface of said sleeve and said shaft, whereby said shaft will be relieved of stress, and yieldable means between said ball bearings and said packing member.

9. A pump and power transmission coupling therefor, wherein said pump has a housing, rotary propulsion means therein, and a drive shaft therefor, which comprises a boss on the pump housing to receive and rotatably support the shaft, a portion of said boss having an enlarged inner diameter extending from the outer end thereof inwardly, thereby providing an annular space around the shaft, a packing gland in said annular space, a driving member fixed to said shaft and rotatable therewith and adapted to be connected with a source of power, a sleeve on said driving member to receive said boss, anti-friction bearing means between the outer surface of said boss and the inner surface of said sleeve, and other anti-friction bearing means between the inner surface of said sleeve and the shaft, whereby said shaft will be relieved of stress, and yieldable means between said last named anti-friction means and said packing gland to exert pressure thereon.

10. A pump and power transmission coupling therefor, wherein said pump has a housing, rotary propulsion means therein, and a drive shaft therefor, which comprises a boss on the pump housing to receive and rotatably support the shaft, a portion of said boss having an enlarged inner diameter extending from the outer end thereof inwardly, thereby providing an annular space around the shaft, a packing gland in said annular space, a pulley fixed to said shaft and adapted to be connected with a source of power, a sleeve on said pulley to receive said boss, a plurality of elongated roller bearings between the outer surface of said boss and the inner surface of said sleeve, a plurality of ball bearings between the inner surface of said sleeve and the shaft, whereby said shaft will be relieved of stress, and yieldable means between said ball bearings and said packing gland to exert pressure thereon.

11. A power transmission coupling assembly for coupling a power source to a mechanism to be driven thereby, comprising a boss on said mechanism, a shaft extending through said boss and beyond the end thereof and rotatably supported thereby, a driving member fixed to said shaft for rotation therewith and adapted to be connected with the power source, a sleeve on said driving member to receive the boss on said mechanism, a plurality of roller bearing members between said boss and sleeve, thereby to relieve said shaft of stress, and a drip opening through said sleeve whereby liquid drip will be expelled therethrough by the action of centrifugal force.

References Cited in the file of this patent

UNITED STATES PATENTS

| | | |
|---|---|---|
| 1,098,187 | Stelzer | May 26, 1914 |
| 1,960,282 | Walker | May 29, 1934 |